(12) United States Patent
Okano et al.

(10) Patent No.: US 6,226,272 B1
(45) Date of Patent: May 1, 2001

(54) METER-RATE BILLING SYSTEM ON A LAN SYSTEM

(75) Inventors: Eiji Okano; Takaya Yamamoto, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/082,832

(22) Filed: May 21, 1998

(30) Foreign Application Priority Data

Jul. 17, 1997 (JP) .................................................... 9-192944

(51) Int. Cl.⁷ .................................................... H04L 12/28
(52) U.S. Cl. .......................... 370/259; 370/389; 370/400; 379/91; 379/95; 379/107; 379/141; 707/1; 707/10
(58) Field of Search .......................... 370/259, 389–401; 379/91, 95, 107, 141; 707/1, 10, 102; 705/404

(56) References Cited

U.S. PATENT DOCUMENTS

| | | | |
|---|---|---|---|
| 5,650,994 | * | 7/1997 | Daley .................................... 370/259 |
| 5,875,242 | * | 2/1999 | Glaser et al. ........................ 379/207 |
| 5,915,008 | * | 6/1999 | Dulman ................................ 370/466 |
| 6,003,030 | * | 12/1999 | Kenner et al. ......................... 707/10 |
| 6,122,276 | * | 9/2000 | Boe et al. ............................. 370/389 |

* cited by examiner

Primary Examiner—Wellington Chin
Assistant Examiner—Maikhanh Tran
(74) Attorney, Agent, or Firm—Helfgott & Karas, P.C.

(57) ABSTRACT

A meter-rate billing system is disclosed in which billing is performed according to an interval while a subscriber uses a network actually, without any exclusive device. The meter-rate billing system on a LAN system for controlling connections to other networks includes a table in which a subscriber information is registered, a LAN controller for retrieving the table according to said subscriber information when a subscriber accesses joining to said LAN system accesses the LAN system, registering the subscriber information in said table if the information has not been registered, updating the registration information if the subscriber information is registered, and deleting the registration information if the registration information is not updated within a predetermined interval, and a billing device for receiving the registration information stored in the table in every predetermined informing interval and judging an interval time during which the registration information is registered in the table.

10 Claims, 12 Drawing Sheets

| IP ADDRESS | PHYSICAL ADDRESS | TTL |
|---|---|---|
| aaa.bbb.ccc.dd1 | aa.bb.cc.dd.ee.11 | n1 |
| aaa.bbb.ccc.dd2 | aa.bb.cc.dd.ee.22 | n2 |
| ⋮ | ⋮ | ⋮ |
| aaa.bbb.ccc.ddx | aa.bb.cc.dd.ee.ff | nx |

| SUBSCRIBER NAME | IP ADDRESS | REGISTRATION TIMES |
|---|---|---|
| SUBSCRIBER A | aa.bb.cc.dd.ee.dd1 | n1 |
| SUBSCRIBER B | aa.bb.cc.dd.ee.dd2 | n2 |
| . . . . | . . . . | . . . . |
| SUBSCRIBER X | aa.bb.cc.dd.ee.ddx | nx |

METER-RATE BILLING SYSTEM ON A LAN SYSTEM

BACKGROUND OF THE INVENTION

1. Field of the Invention

The present invention relates to a meter-rate billing system on a LAN system. More particularly, it relates to a meter-rate billing system for reducing a traffic load of traffics on a billing procedure in which billing is performed according to an active time period during which an application service is received.

2. Description of the Related Art

In a LAN (local area network) system, when performing a billing procedure, an exclusive device is prepared to capture logs of all packets flowing on a network and to make billing possible by calculating the captured logs.

There have been employed two billing procedures, one procedure charging according to a data amount and, the other procedure charging according to an active time period during which an application service is received. In the billing procedure according to the data amount, a data size of a packet transmitted and received for each terminal is accumulated to obtain a total data amount. In the other billing procedure according to the active time period during which an application service is received, a time stamp of each packet is employed.

Additionally, in a meter-rate billing system according to an active time period on a system using a DHCP, i.e., Dynamic Host Configuration Protocol, for dynamically assigning IP addresses, a DHCP server should be prepared. The DHCP server assigns an IP address out from those pooled by the DHCP server according to a request transmitted from a personal computer on each subscriber side.

When a subscriber finishes receiving a service, a message informing the end of the service is transmitted from the personal computer to a DHCP server on a center. The DHCP server records a time period from the time of assigning an IP address to the time of receiving a message informing the end of the service to make billing possible.

However, there have been some problems in the above-explained billing systems. In a system for capturing logs, it is required to prepare an exclusive device for capturing logs. Further, a large volume of logs has to be processed, and then a billing procedure is burdened with a heavy load.

On the other hand, a meter-rate billing method on a system using the above described DHCP, IP address assignment, and data transmission and reception are required between a DHCP server on a center side and a personal computer of each subscriber, when finishing receiving the application service. Therefore, it is indispensable to increase traffics.

In addition, a personal computer requests to assign an IP address when a power is On. Therefore, although an application service using a LAN is not received, a subscriber is billed. When using a WWW access, the unutilized times of a network actually, for example, while the subscriber reads the contents of a home page, becomes subject to be billed. Therefore, the meter-rate billing method may not be considered as accuracy.

SUMMARY OF THE INVENTION

Accordingly, it is an object of the present invention to provide a meter-rate billing system in which billing is measured according to an actual time period during which a subscriber uses the network without preparing an exclusive device.

It is another object of the present invention to provide a meter-rate billing system in which there is no need to facilitate communications between a server and a personal computer as billing is performed by employing a DHCP system.

DESCRIPTION OF THE PREFERRED EMBODIMENTS

Embodiments according to the present invention will be now explained in accompanying with the attached drawings. Throughout the following descriptions, the same reference numerals and symbols are used to denote and identify corresponding or identical components.

Figure 1:
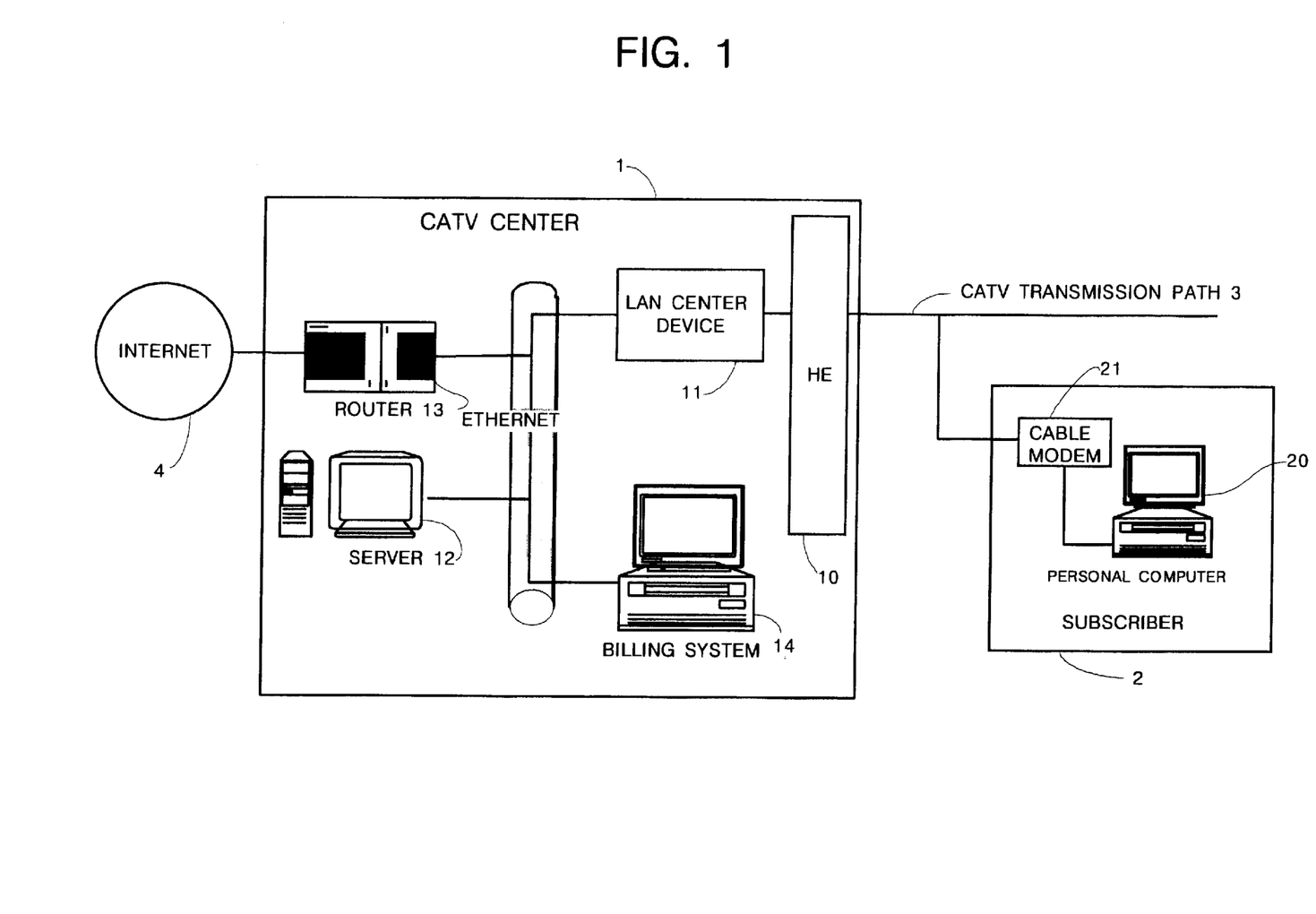
FIG. 1 is a structural block diagram of a CATV-LAN system employing to the present invention.

FIG. 1 shows an example of a CATV-LAN network system employing the present invention. In FIG. 1, a subscriber 2 is connected to a CATV center 1 through a CATV transmission path 3. Further, the CATV center 1 is connected to other networks, not shown in FIG. 1, through an internet 4.

A personal computer 20 set at the subscriber 2 is linked to a head end 10 of the CATV center 1 through a cable modem 21 and the CATV transmission path 3. The subscriber can access to a server 12 in the CATV center 1 or to the internet 4 through a router 13.

Figure 2:
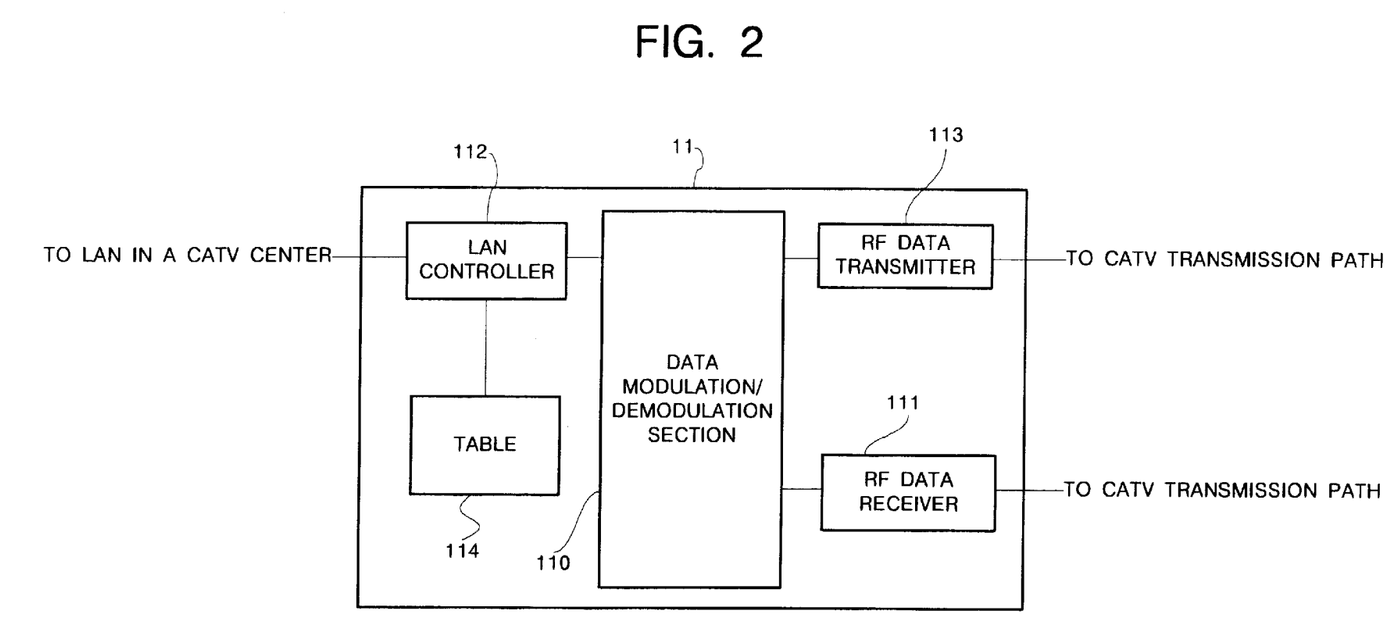
FIG. 2 is a structural block diagram of a LAN center device shown in FIG. 1.

In this system, a billing procedure on the billing system 14 set on the CATV center 1 is characterized by the present invention. FIG. 2 is a structural example of a LAN center device 11 having interfaces to a LAN in the CATV center 1 and the CATV transmission path 3.

The LAN center device 11 includes a data modulation/demodulation section 110, which demodulates data of radio frequency (RF) signals transmitted to the CATV transmission path 3 and received at a RF data receiver 111, to base band data.

On the other hand, the data modulation/demodulation section 110 receives the data transmitted from the LAN in the center 1, from the LAN controller 112, modulates base band data to RF data to transmit it to the CATV transmission path 3 through a RF data transmitter 113.

Figure 3:
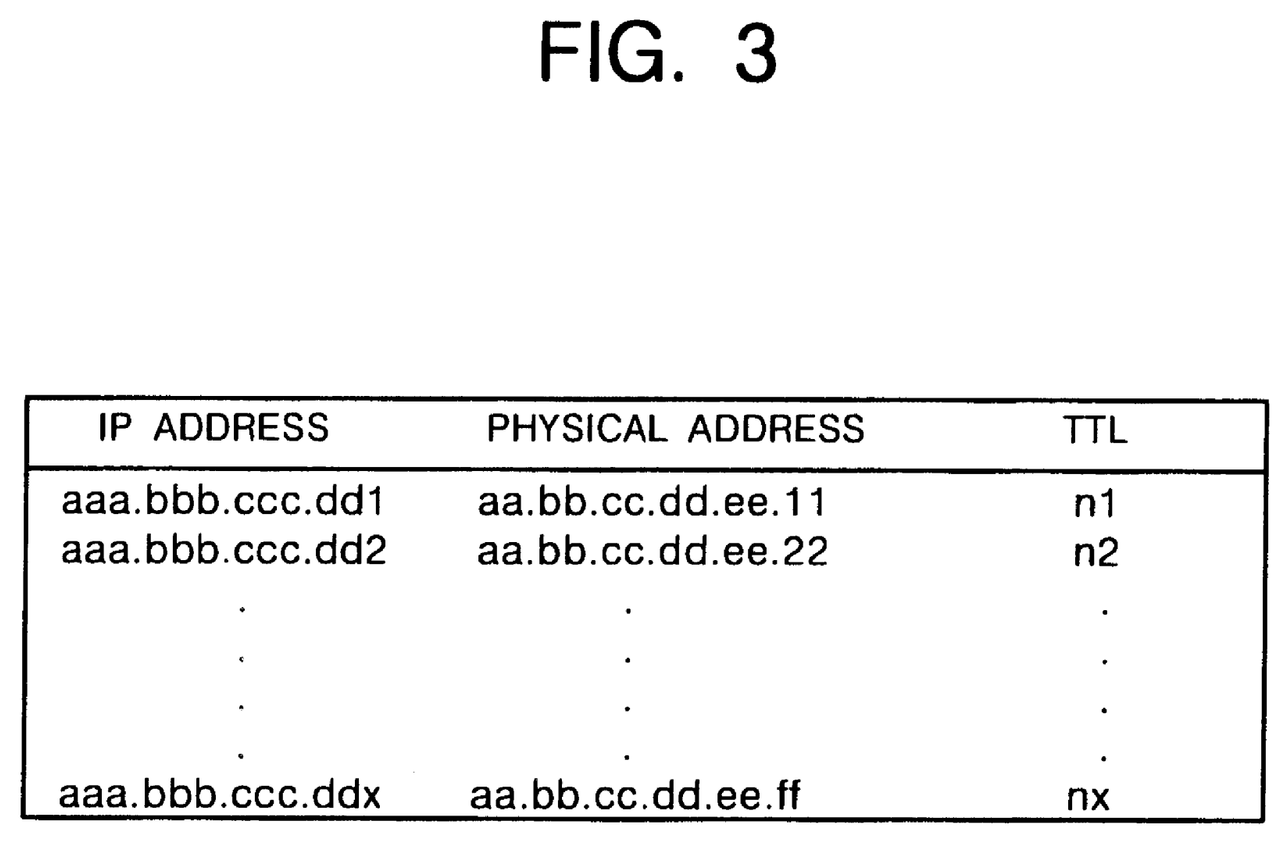
FIG. 3 shows an example of a table information in the LAN center device.

The LAN center device 11 includes a memory storing a table 114 connected to a LAN controller 112, which is a feature of the present invention. An example of contents on the table 114 is shown in FIG. 3. In FIG. 3, the table 114 includes IP addresses, physical addresses and time TTLs remained in the table 114. The table is structured so that the physical address of a corresponding subscriber can be retrieved from an IP address.

In this embodiment, an IP address is pre-assigned corresponding to the personal computer 20 of each subscriber 2. An IP address is expressed as aaa.bbb.ccc.dd1~ddx with decimal numbers by dividing 32 bits of binary numbers into four sections, each having eight bits.

Additionally, the NIC (Network Information Center) of the SRI (Stanford Research Institute) international administrates the IP addresses unitarily. Further, the physical address means data expressing names of a manufacture and a product by a hexadecimal number.

A predetermined number, for example, 3, is set as a remaining time TTL. Further, when updating the table 114 in every predetermined regular interval as explained later, the number is subtracted one by one if there is no writing to the table. Thereby, the remaining time on the table 114 of an appropriate address can be measured.

Figure 4:
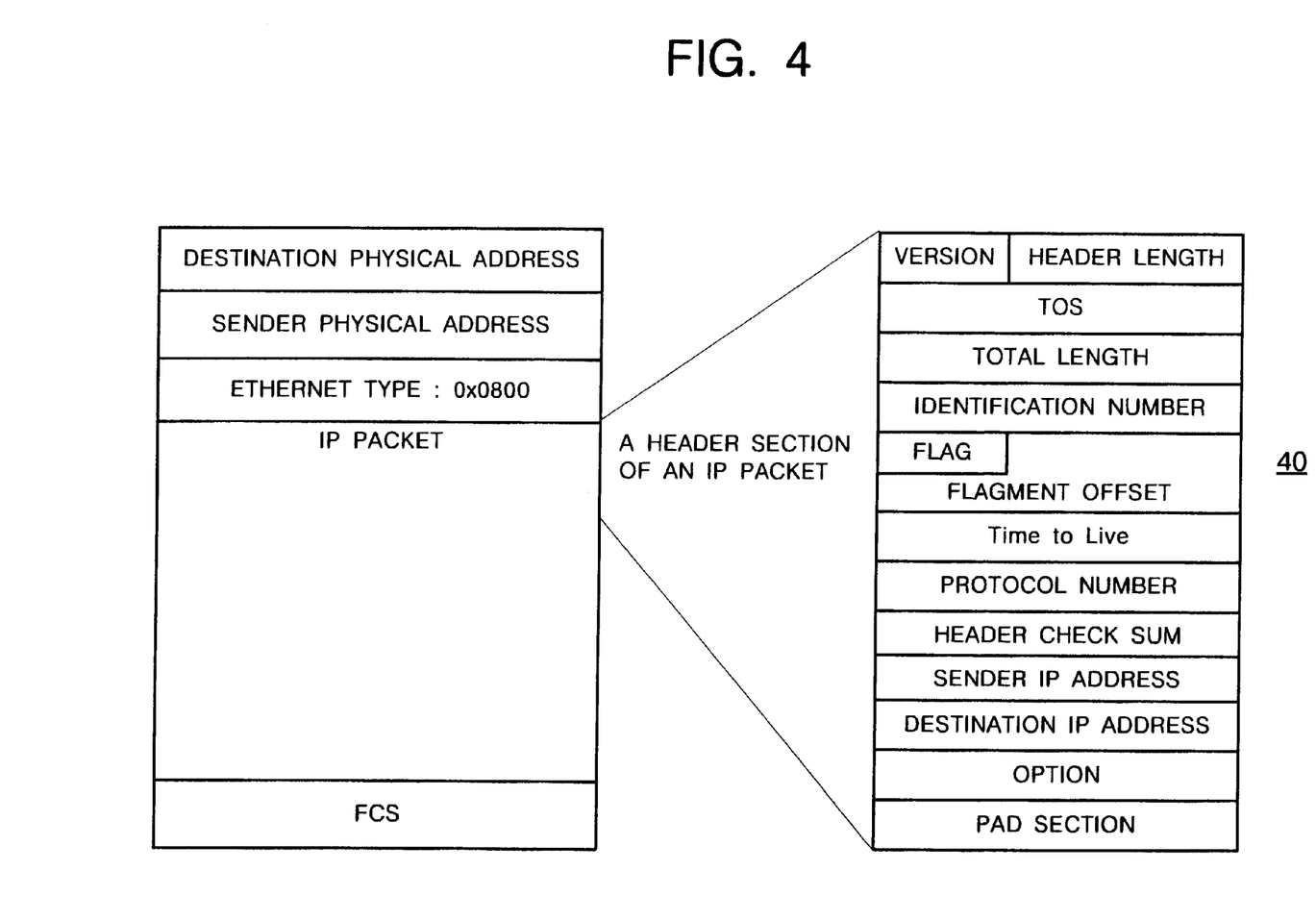
FIG. 4 is a structural example of cells transmitting data.

In communications under an IP protocol, data information of IP and physical addresses of a sender and a destination is added to header sections of all packets as shown in FIG. 4. Then, the data section is added to the header section to form a cell.

The data cell output from the personal computer 20 of the subscriber 2 is transmitted as a RF signal to the LAN center device 11 in the CATV center 1 through the cable modem 21 and the CATV transmission path 3.

In the LAN center device 11, the RF signal received in the RF data receiver 111 is converted to LAN data by the data modulation/demodulation section 110. Then, the converted LAN data is transmitted to a LAN segment connected to the LAN center device 11, when the destination IP address is located outside of the CATV network, according to a routing function in the LAN controller 112. The LAN segment is formed by including a router 13 connected through an Ethernet 14.

When the destination IP address is located inside of the CATV network, the data modulation/demodulation section 110 converts the data to the RF signal again according to a routing function of the LAN controller 112. Then, the converted signal is transmitted to the CATV transmission path 3 toward a modem connected to the appropriate personal computer through the RF data transmitter 113.

A routing function of the LAN controller 112 in the above-described LAN center device 11 will be now explained in detail.

Figure 5:
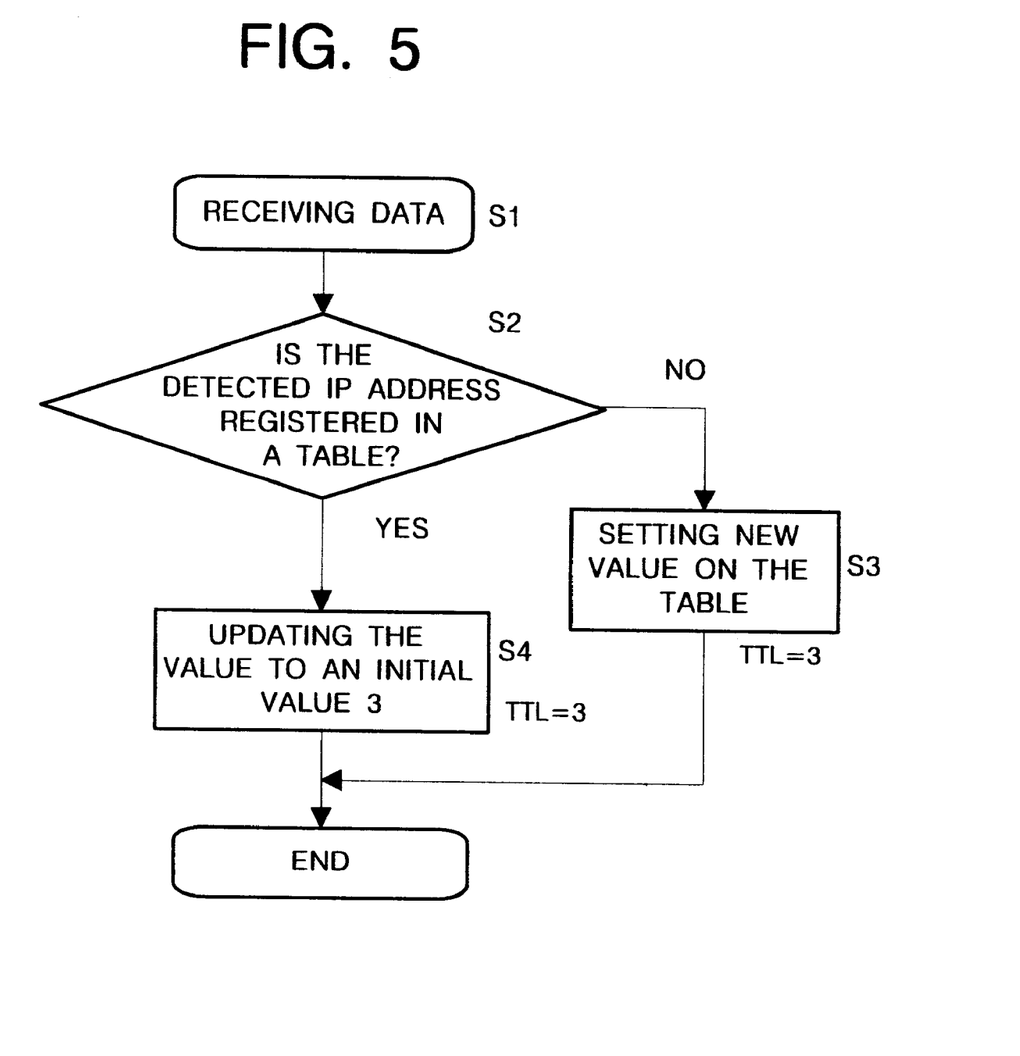
FIG. 5 is an operational flowing chart for registering/updating data on a LAN controller of the LAN center device.

FIG. 5 shows an operational flowing chart of receiving data. When the LAN controller 112 receives the data (STEP S1), the controller 112 detects the sender IP address in the header section 40, and judges whether or not the address is already registered in the table 114 (STEP S2).

If the appropriate sender IP address is not registered in the table 114, an initial value, for example, 3, is set as the number of the remaining time TTL on the table 114 (STEP S3).

On the other hand, when the address is registered in the table 114, the remaining time TTL, which is should be, at least, 1, is updated to the initial value 3 and the processing is finished (STEP S4).

Figure 6:
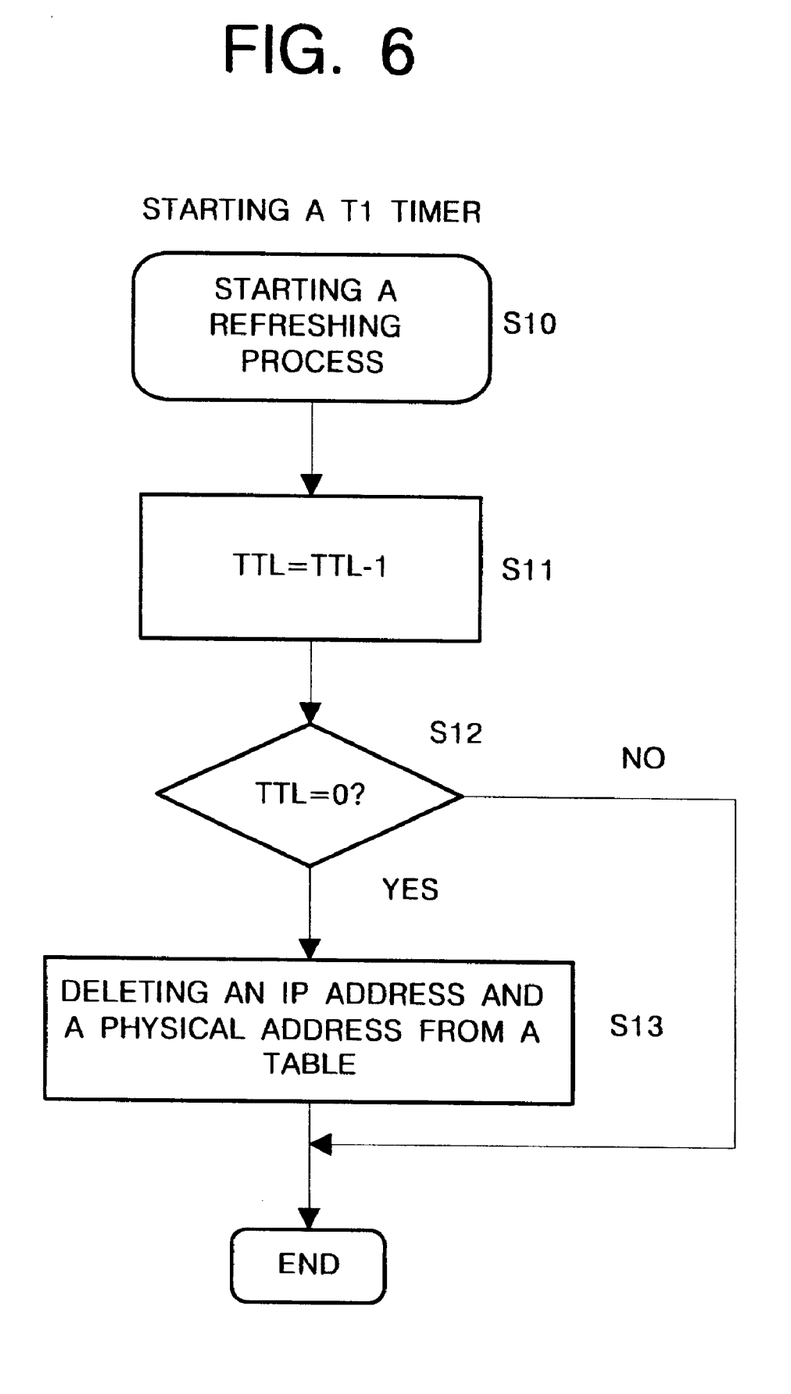
FIG. 6 is an operational flowing chart for refreshing data on a table of the LAN controller.

FIG. 6 is an operational flowing chart of a refreshing process. This process is started by a T1 timer, not show in FIG. 6. At first, every time a predetermined interval elapsed, the refreshing process is started by a T1 timer (STEP S10). When starting the refreshing process, the remaining time TTL is subtracted one by one (STEP S11).

Next, it is judged whether or not the remaining time TTL is zero (STEP S12). If the remaining time TTL is not zero, the refreshing process is finished. If the remaining time is zero, the IP address and the corresponding physical address are deleted from the table 114 (STEP S13).

Figure 7:
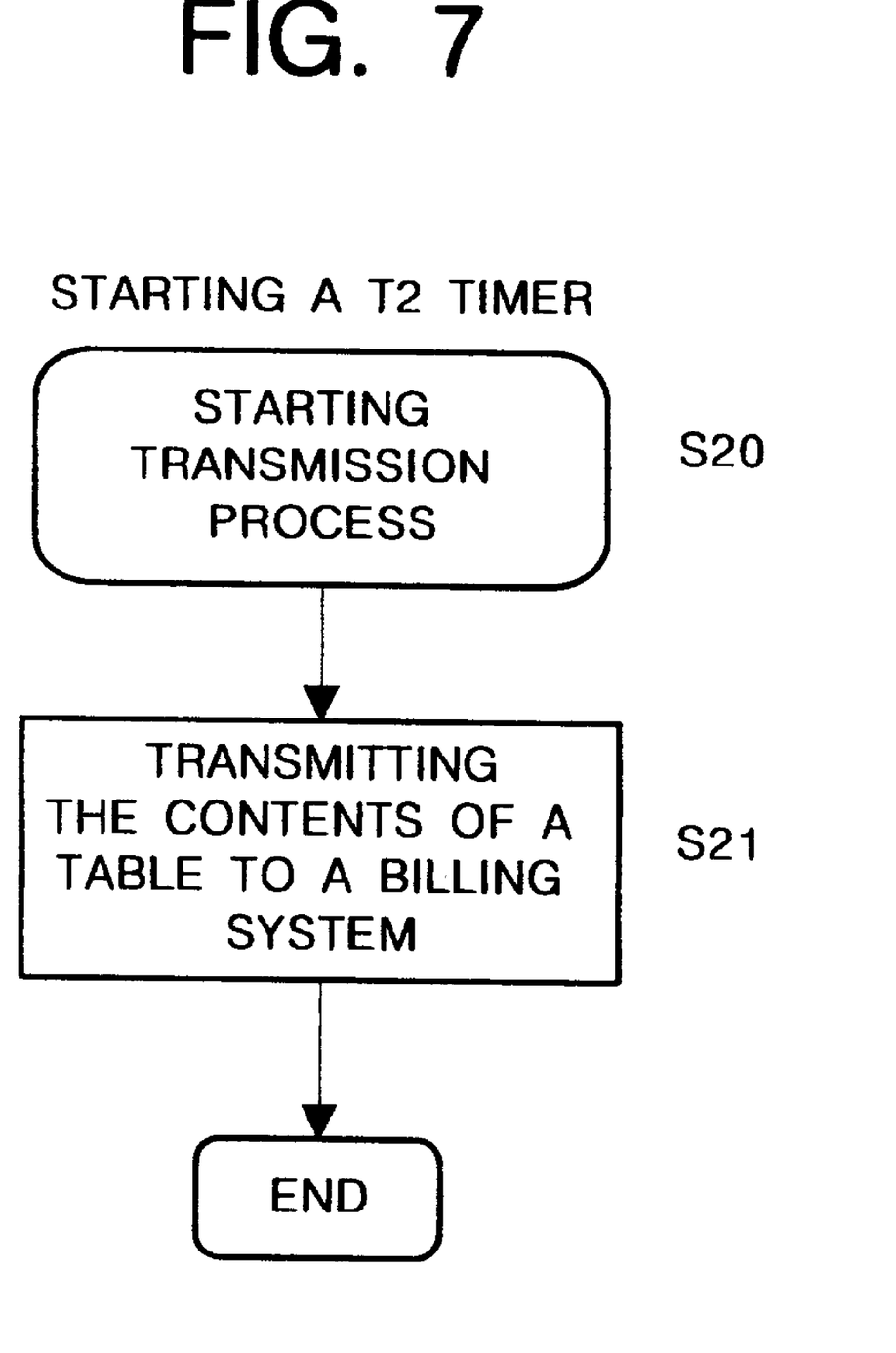
FIG. 7 is an operational flowing chart for informing a table information to the billing system by the LAN controller.

FIG. 7 is an operational flowing chart of transmitting data to the billing system. The process is started by a T2 timer, not shown in FIG. 7. At first, every time a predetermined time elapsed, the transmission process is started by the T2 timer (STEP S20). When starting the transmission process, contents of the billing table 114 are transmitted to the billing system 14 (STEP S21). In this case, the data may be transmitted either periodically from the LAN controller 112 or responding to a polling from the billing system 14.

In this example, a predetermined interval counted by the T2 timer is set as to be larger than, at least, three times, of the predetermined interval counted by the T1 timer. Therefore, once the IP address is registered on the table 114, the data is not updated within the predetermined interval operated by the T2 timer, and the remaining time TTL becomes zero, the data is not informed to the billing table 114.

Figure 8:
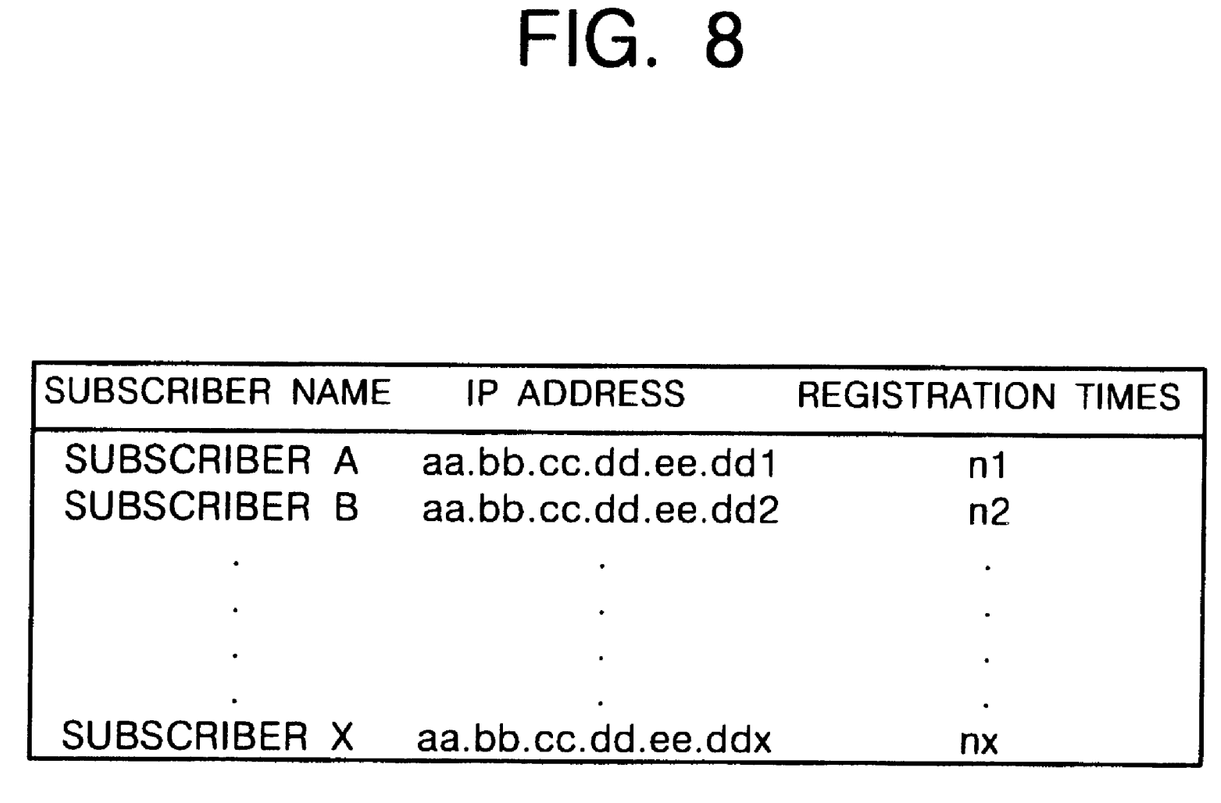
FIG. 8 shows an example of a subscriber information on the billing system.

FIG. 8 illustrates a table including subscriber information according to the data transmitted to the billing system 14 created in the above-described procedures in which subscriber names, IP addresses and the registration times are registered. When assigning an IP address to one subscriber, a connection between each subscriber and the IP address is set by the server 12. Thus, the billing system 14 can create the subscriber information shown in FIG. 8 based on the IP addresses transmitted from the LAN controller 112 of the LAN center device 11.

Further, in FIG. 8, the registration times are increased every time the contents of the table 114 is transmitted from the LAN controller 112. Therefore, an accumulated value of the remaining time TTL of the IP address in the table 114 can be estimated by the registration times of the subscriber information. In the billing system 14, billing to each subscriber can be performed according to the registration times of the subscriber information.

Figure 9:
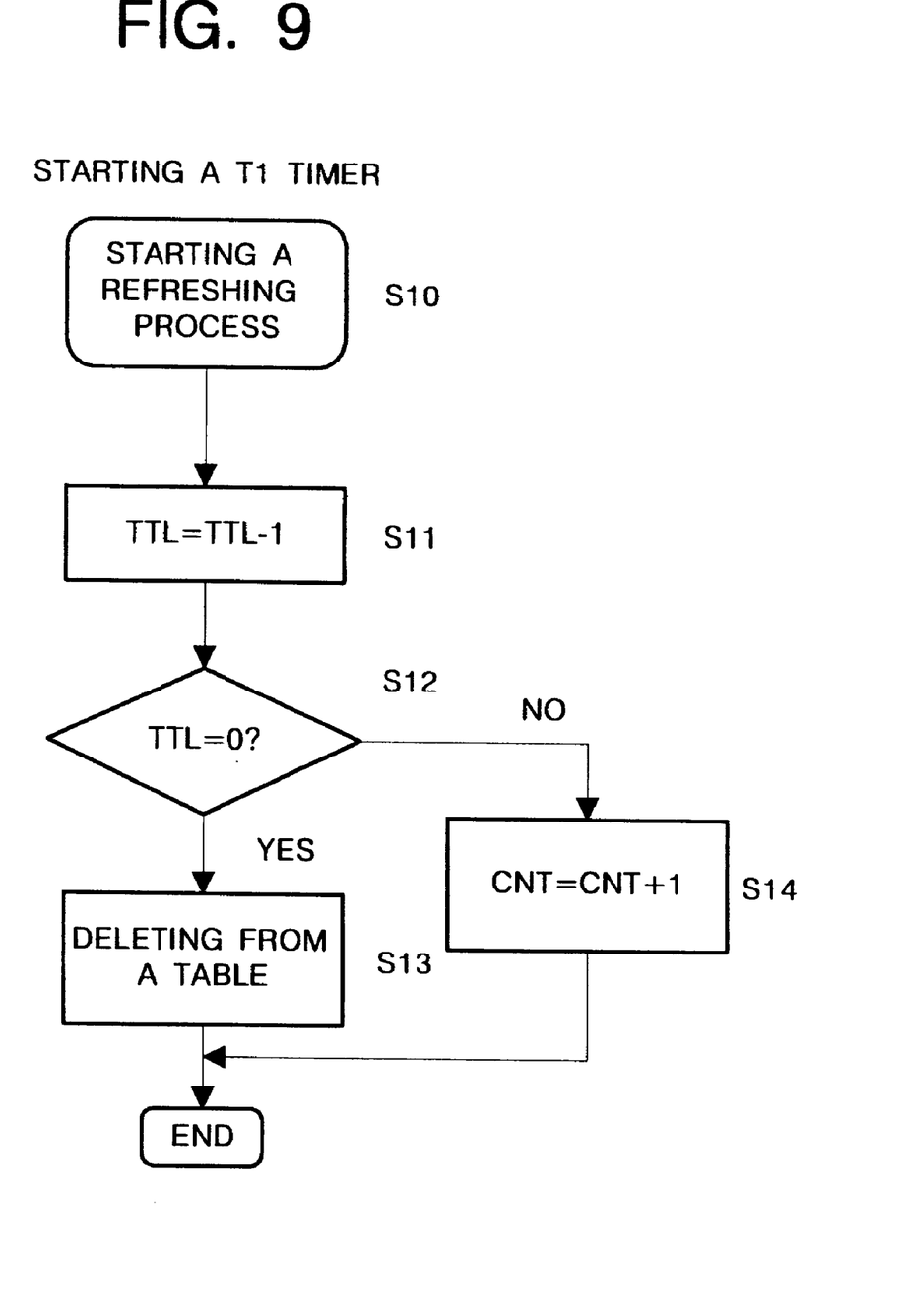
FIG. 9 is an operational flowing chart of refreshing data on the table of the LAN controller according to other embodiment of the present invention.

FIG. 9 is an operational flowing chart of refreshing the data according to other embodiment of the present invention. This refreshing process is started by a T1 timer, not shown in FIG. 9, similarly with the operation shown in FIG. 6. At first, every time the predetermined interval elapsed, the refreshing process is started by the T1 timer (STEP S10). When starting the refreshing process, the remaining TTL is subtracted one by one (STEP S11).

Then, it is judged whether or not the remaining time TTL is zero (STEP S12). If the remaining time TTL is zero, the IP address and the corresponding physical address are deleted from the table 114 (STEP S13). Further, in the operational flowing chart shown in FIG. 9, a counter is prepared, which increases counted values one by one when the remaining time TTL is not zero.

Figure 10:
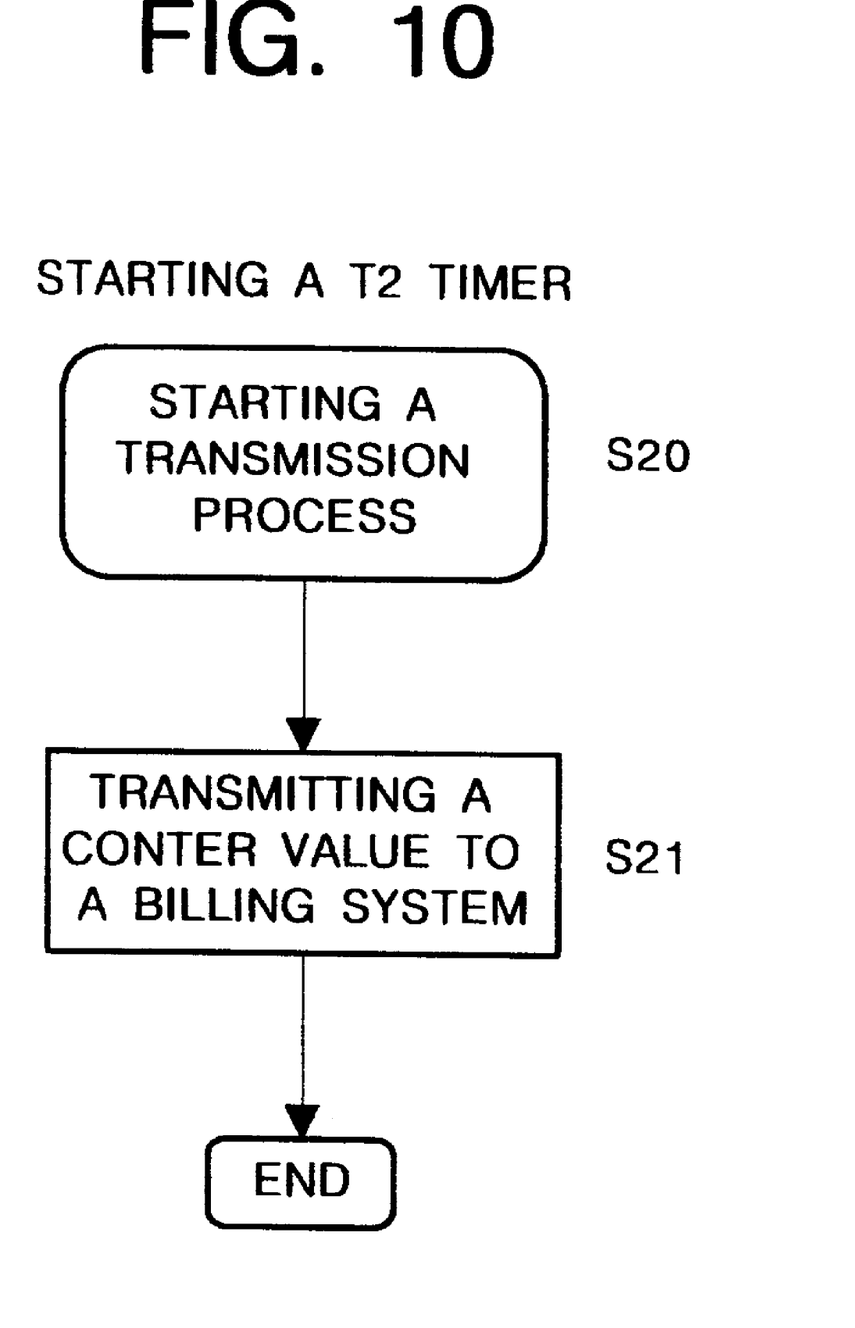
FIG. 10 is an operational flowing chart of informing a table information to the billing system by the LAN controller according to other embodiment of the present invention.

On the other hand, FIG. 10 shows an operational flowing chart of transmitting data to the billing system in corresponding to the embodiment shown in FIG. 9. The transmission process is started by a T2 timer, not shown in FIG. 10. At first, every time a predetermined interval elapsed, the transmission process is started by the T2 timer (STEP S20). When starting the transmission process, the counted value of the counter in the table 114 is transmitted to the billing system 14 (STEP S21).

In this case, the counted value of the counter in the table 114 can be used as it is as the registration times when registering to the subscriber information shown in FIG. 8 in the billing system 14.

Further, on the above-described explanation, the counter of the table 114 may be used as a cyclic counter, so that the billing system 14 easily obtains the times of registering the subscriber information to the table 114 in a predetermined informing interval according to a difference between each counted value of the counter in the predetermined informing interval.

In this case, a predetermined informing interval for informing to the billing system 14 becomes shorter than a period unitl when the counter is overflowed or counts up one cycle. Thereby, it is easy to obtain the times for registering the subscriber information to the table 114 in a predetermined informing interval, according to a difference between counted values of the counter received in every predetermined informing intervals as described above.

Figure 11:
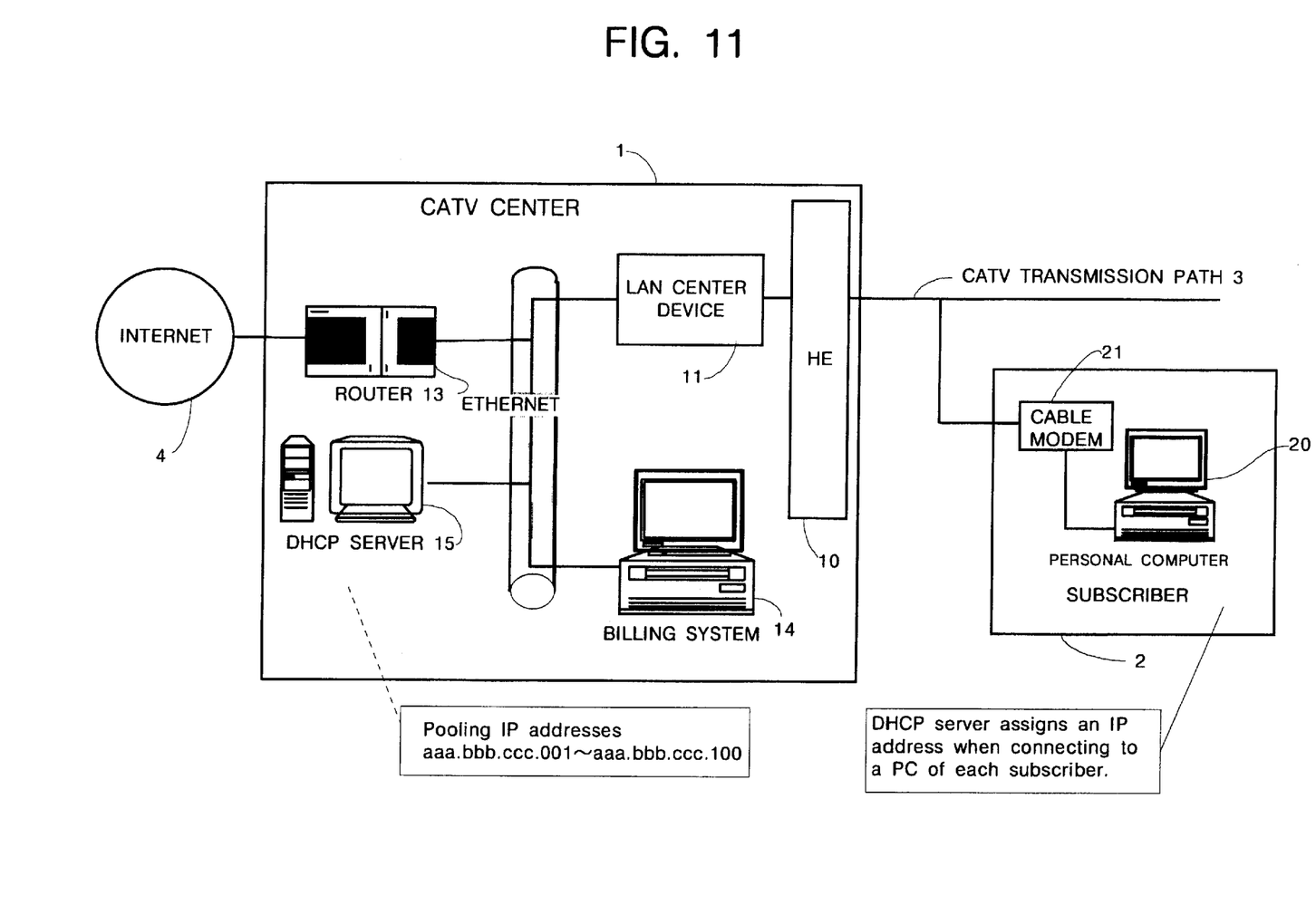
FIG. 11 is a structural block diagram of a CATV-LAN system according to the present invention when employing a DHCP server.

FIG. 11 shows a system block diagram according to other embodiment of the present invention. In the example shown in FIG. 11, a DHCP server 15 assigns an IP address by a DHCP, i.e., Dynamic Host Configuration Protocol. When assigning an IP address by the DHCP, an IP address pooled by the DHCP server 15 is assigned every time a subscriber requests to assign the IP address. When assigning the address by the DHCP, there is no guarantee to assign a same IP address to the same subscriber. However, the DHCP server 15 keeps information of the relation between the assigned IP address and the subscriber to be assigned.

Figure 12:
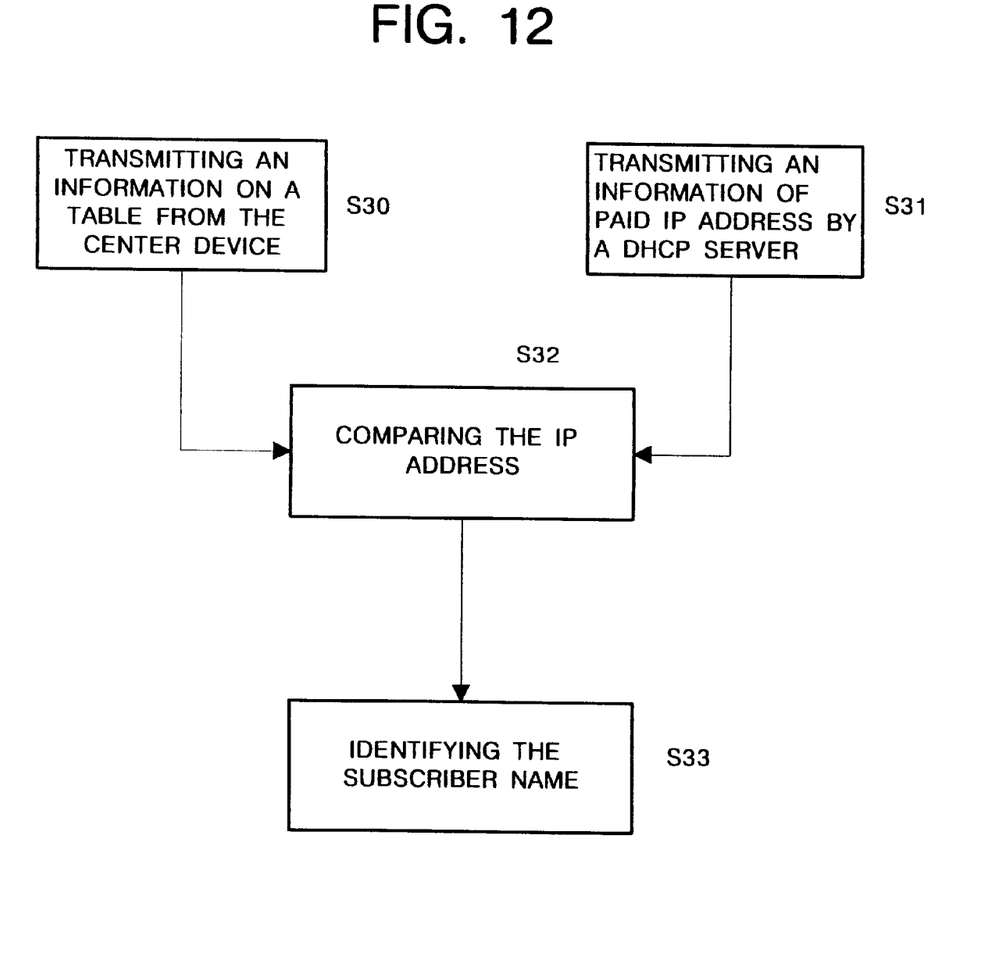
FIG. 12 is an operational flowing chart for processing subscribers on the billing system on assigning IP addresses when employing a DHCP.

FIG. 12 is an operational flowing chart of a subscriber process in the billing system 14 when assigning the IP address by the DHCP. As shown in FIG. 12, the IP address registered in the table 114 is transmitted from the LAN center device 11 to the billing system 14 (STEP S30). In addition, the DHCP server 15 transmits the information of the relation between the assigned IP address and the subscriber to the billing system 14 (STEP S31).

Then, in the billing system 14, the IP address is compared with both of the IP address and the subscriber transmitted from the DHCP server 15 according to the information of the relation (STEP S32).

Thereby, it is possible to identify the subscriber name in the billing system 14 (STEP S33). Therefore, it is further possible to create a subscriber information table in the billing system 14 shown in FIG. 6.

As explained in accompanying with the drawings, it becomes possible to perform billing according to an interval while the subscriber actually uses the network by efficiently using a routing function provided in the LAN center device 11 without preparing an exclusive device.

As there is no need to facilitate communications between the server 12 and the cable modem 21 to perform billing such as the DHCP, it can be realized to perform billing without giving influence to traffics.

Additionally, it is possible to modify accuracy of billing according to a timing for deleting the registration information transmitted from the table 114 and a timing for informing the data to the billing system 14.

The present invention may be embodied in other specific forms without departing from the sprit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A meter-rate billing system on a LAN system for controlling connections to other networks, comprising:
   a table in which a subscriber information is registered;
   a LAN controller for retrieving the table according to a subscriber information when a subscriber joining to said LAN system accesses to the LAN system, registering the subscriber information in the table if said subscriber information has not been registered, updating a registration information if the registration information is registered, and deleting the registration information if the registration information is not updated in a predetermined interval; and
   a billing device for receiving the registration information stored in the table in every predetermined informing interval and judging an interval time during which said registration information is kept in said table.

2. The meter-rate billing system according to claim 1, wherein said predetermined interval is set as to be shorter than said predetermined informing interval.

3. The meter-rate billing system according to claim 1, wherein said subscriber information includes an IP address assigned to said subscriber, said LAN controller includes a counter for counting times of registering the data in the table per the IP address, and the billing device receives registration times to the table per the IP address counted in the counter.

4. The meter-rate billing system according to claim 1, wherein said LAN controller includes a counter for counting times of registering the data in the table, the counter is a cyclic counter, and the billing device obtains times of registering the subscriber data to the table in the predetermined informing interval according to a difference between the counted values of the counter received per said predetermined informing interval.

5. The meter-rate billing system according to claim 3, wherein an interval while said counter is overflowed or the counter cycle is completed is set as to be shorter than said predetermined interval for informing the counted value of the counter to said billing system.

6. The meter-rate billing system according to claim 1, wherein the subscriber information registered and up-dated on the table is a sender subscriber information.

7. The meter-rate billing system according to claim 1, wherein the subscriber information registered and up-dated on the table is a destination subscriber information.

8. The meter-rate billing system according to claim 4, wherein an interval while said counter is overflowed or the counter cycle is completed is set as to be shorter than said predetermined interval for informing the counted value of the counter to said billing system.

9. The meter-rate billing system according to claim 5, wherein the subscriber information registered and up-dated on the table is a sender subscriber information.

10. The meter-rate billing system according to claim 5, wherein the subscriber information registered and up-dated on the table is a destination subscriber information.

* * * * *